(12) United States Patent
Zandee

(10) Patent No.: US 6,266,149 B1
(45) Date of Patent: Jul. 24, 2001

(54) PRINTER DRIVER WITH COMPACT REPRESENTATION OF DRAWING ENVIRONMENT CHANGES

(75) Inventor: James C. Zandee, Santa Clara, CA (US)

(73) Assignee: Apple Computer, Inc., Cupertino, CA (US)

(*) Notice: Subject to any disclaimer, the term of this patent is extended or adjusted under 35 U.S.C. 154(b) by 1277 days.

(21) Appl. No.: 08/593,114

(22) Filed: Feb. 1, 1996

Related U.S. Application Data

(63) Continuation of application No. 08/198,231, filed on Feb. 16, 1994.

(51) Int. Cl.⁷ ................................................. G06F 15/00
(52) U.S. Cl. ................................... 358/1.15; 345/118
(58) Field of Search ................................ 395/101, 104, 395/110, 114, 115, 147, 157, 159, 501, 522, 523, 526, 418; 358/524, 426, 261.1, 261.2, 261.3, 427

(56) References Cited

U.S. PATENT DOCUMENTS

| | | | |
|---|---|---|---|
| 4,399,503 | * 8/1983 | Hawley | 364/200 |
| 4,704,040 | * 11/1987 | Takano et al. | 400/121 |
| 4,724,483 | * 2/1988 | Shinada | 358/135 |
| 5,046,027 | * 9/1991 | Taaffe et al. | 364/521 |
| 5,097,411 | 3/1992 | Doyle et al. | 395/600 |
| 5,218,431 | * 6/1993 | Gleicher et al. | 388/13 |
| 5,241,625 | 8/1993 | Epard et al. | 395/163 |
| 5,257,097 | 10/1993 | Pineau et al. | 358/500 |
| 5,276,798 | * 1/1994 | Peaslee et al. | 395/162 |
| 5,367,633 | * 11/1994 | Mathehy et al. | 395/164 |
| 5,379,366 | * 1/1995 | Noyes | 395/54 |
| 5,381,524 | * 1/1995 | Lewis et al. | 395/161 |

FOREIGN PATENT DOCUMENTS 0 027 566   4/1981 (EP).

OTHER PUBLICATIONS

Bailey, *Computer Graphics: Emerging standards*, Electronic Design, 31:103–110 (1983).

* cited by examiner

*Primary Examiner*—Dov Popovici
*Assistant Examiner*—Gabriel I. Garcia
(74) *Attorney, Agent, or Firm*—Burns, Doane, Swecker & Mathis, L.L.P.

(57) ABSTRACT

A printer driver, for example a QuickDraw printer driver, keeps track of changes in a drawing environment (specified by a GrafPort) by saving State records. Rather than filling up the State with the contents of each pattern and clip region, references to each of these members are stored in the State. This referencing allows each component of a State to be saved separately while still allowing the State to be reproduced precisely when it is time to draw. Referencing can greatly reduce disk accesses and file size, thereby accelerating printing. Referencing also allows significant time to be saved during state comparison. Whereas previous drivers have required a State to GrafPort comparison at translation (drawing) time, in the present method, each reference in the current state may be compared with references from the previous state to see which fields have changed. Comparing references, which may be stored in four bytes, is much faster than comparing large patterns and regions.

3 Claims, 3 Drawing Sheets

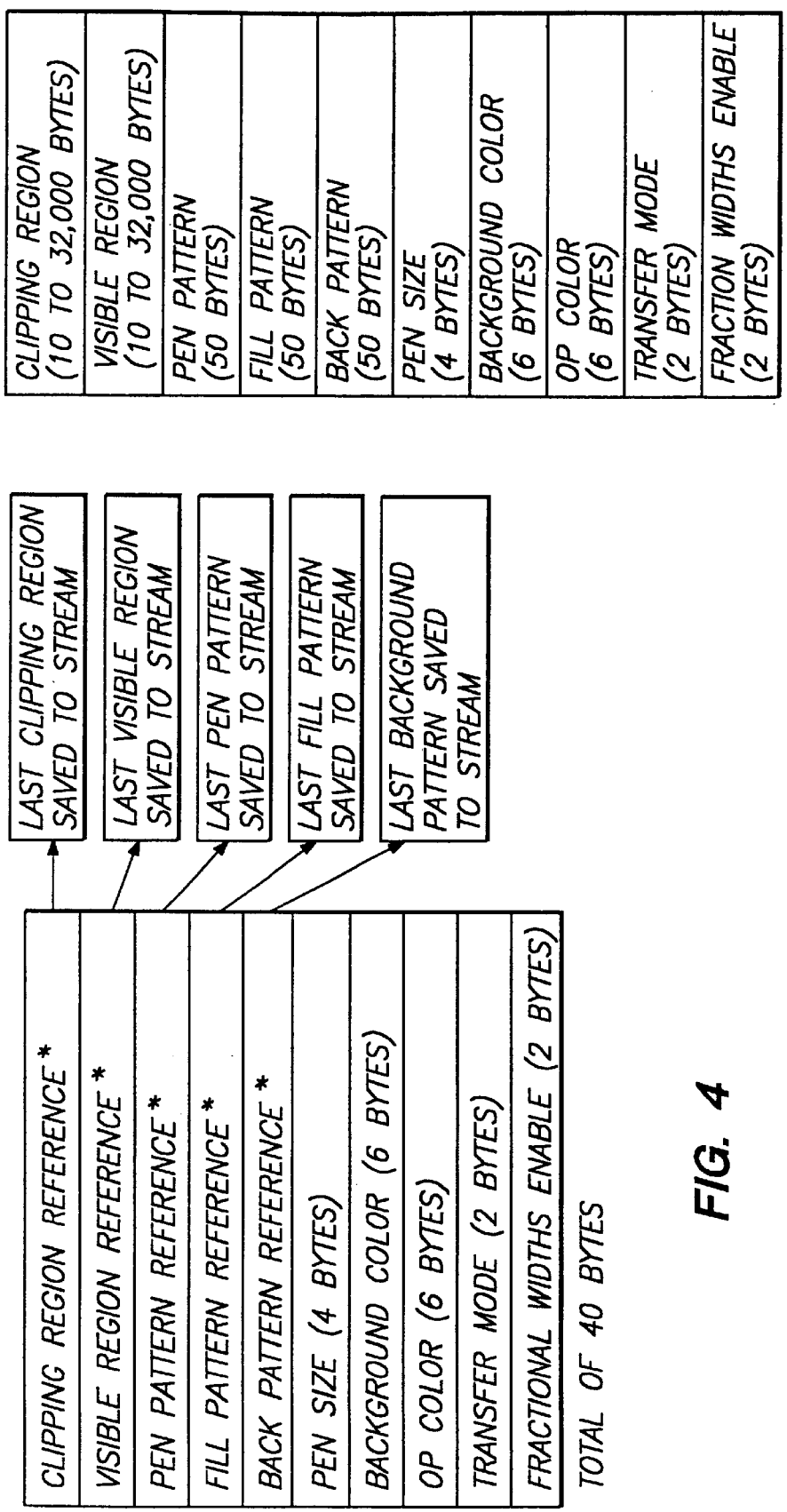

PRINTER DRIVER WITH COMPACT REPRESENTATION OF DRAWING ENVIRONMENT CHANGES

This application is a continuation, of application Ser. No. 08/198,231, filed Feb. 16, 1994.

BACKGROUND OF THE INVENTION

1. Field of the Invention

The present invention relates to printer drivers and methods of communication between a computer and a printer in a computer graphics system. More particularly, the present invention relates to printer drivers that perform graphic operations using a set of graphics primitives.

2. State of the Art

The relative complexity of rendering a graphical image, whether on a computer display or on a printed page, has resulted in the development of a number of different graphical "languages". Some of these languages, for example Printer Control Language (PCL), are primarily applicable to producing hard copy. Other "page description" languages are applicable to both displaying images on a computer screen and printing images on print media. For example, in a Macintosh computer, a graphics library known as "QuickDraw", part of the Macintosh Operating System, may be used to produce images on screen or off screen. Similarly, in PC-compatible computers, the Windows operating system provides drawing routines in the form of a Graphics Device Interface library which is used for imaging all complex graphic operations either on or off screen. For purposes of describing the present invention, reference will be made to QuickDraw; it should be understood, however, that the invention is and will be applicable to a wide variety of graphical languages.

Referring to FIG. 1, QuickDraw converts graphics commands from a higher-level application program 101 for presentation on a video screen or for printing on print media. QuickDraw provides a graphics library built into every Macintosh computer, and is described more fully in "Inside Macintosh, Vol. 1, by Apple Computer, Inc., which is incorporated herein by reference. Besides being used to draw most of the contents of the computer screen, QuickDraw may be used for communicating with a computer printer. QuickDraw routines stored in the computer's read-only memory (ROM) may therefore constitute a core, which, together with certain printer-dependent control functions, forms a printer driver 300 responsive to commands from an application program to cause a printer 107 to print a desired image from memory 105 onto a page.

QuickDraw defines some clear mathematical constructs that are widely used in its procedures, functions and data types. The most basic QuickDraw type is the point which consists of two integers for specifying a horizontal and vertical position in a coordinate plane. Other types are lines, rectangles, ovals, arcs, rounded-corner rectangles, polygons, and regions. Many drawing operations consist of filling or framing these objects with a pattern. QuickDraw also supports drawing text in multiple fonts in various sizes and styles. QuickDraw draws by altering a bit image in an area of memory, the frame buffer in the case of screen display and the print buffer in the case of printed output.

QuickDraw allows a number of separate drawing areas called GrafPorts to be defined. Each GrafPort has its own complete drawing environment that defines how and where graphic operations will have their effect. Many GrafPorts can be open at once and each one will have its own coordinate system, drawing pattern, background pattern, pen size and location, character font and style, etc. GrafPorts are fundamental to the Macintosh's overlapping window user interface. One GrafPort may be designated as the printer GrafPort in order to draw a page for printing.

Each GrafPort has a rectangle, called the portRect, which defines the area for use by the GrafPort. Each GrafPort also has its own clipping region which can be used to further limit drawing to any subset of the GrafPorts's portRect. Each GrafPort has a drawing pen which is used for drawing lines, shapes, and text. The pen has four characteristics: a location, a size, a drawing mode, and a drawing pattern. The pen mode and pen pattern determine how the bits "under" the pen are affected as the pen "moves over" them when drawing lines and shapes. Each GrafPort also has its own text font, style, mode and size for drawing text within the GrafPort.

There are five different drawing operations for drawing different image shapes, namely, frame, paint, erase, invert and fill. Each of the shape-drawing operations can be applied to rectangles, regions, ovals arcs, rounded-corner rectangles and polygons. In addition, QuickDraw provides routines to draw text and to perform bit-copy operations.

For each shape that QuickDraw can produce, there are separate procedures that perform the basic graphic operations to produce that shape: frame, paint, erase, invert and fill. Each of these procedures in turn calls a low-level internal QuickDraw routine for the shape to actually perform the drawing. For example, The FrameOval, PaintOval, EraseOval, InvertOval and FillOval procedures in QuickDraw actually call a single low-level routine within QuickDraw which performs these operations on ovals. There are also low-level procedures for drawing text, lines, and for performing bitcopy operations. Low-level routines are also called bottleneck procedures, which may be regarded as graphics primitives. The main QuickDraw bottleneck procedures are: StdText, StdLine, StdBits, StdRect, StdRRect, StdOval, StdPoly and StdRgn.

In order to image a page, a QuickDraw printer driver operates first in a capture mode of operation, then in a playback mode of operation. During capture, typically, GrafPort setting changes and commands to draw various shapes are received. Information reflecting these changes is saved in a stream, for example to a disk file. When a Close Page command is received, the printer driver causes the application program to wait. The printer driver then plays back the shapes and GrafPort changes that describe the page and manipulates bits in the print buffer accordingly to render an image of the page. Because of the memory-intensive nature of graphics information, the page is typically imaged in a succession of bands.

Most QuickDraw print drivers use a "DrawPicture" methodology to print. This method requires each and every GrafPort change to be recorded and played back for each band. As a result, the number of disk accesses and the amount of disk storage required to print a typical print job becomes large. Because of disk latency, printing time is prolonged.

One solution has been to, instead of recording each and every change to printer GrafPort in the order in which it occurs, recording to stream a "snapshot" of the GrafPort state at the time a command to draw a shape is received (if the GrafPort state has changed since it was last recorded). The shape is then stored to stream with a reference to the GrafPort state. Additionally, information denoting a bounding rectangle of the shape is stored with the shape. When the printer driver renders an imaging band, it can then send a bounding rectangle of the band to a stream manager, requesting playback of only those shapes whose bounding rectangles intersect with the imaging band.

In this improved arrangement then, the printer driver stores in essence a condensed picture of the GrafPort fields in a "State" object at the time each shape is drawn by the application. As shapes are rendered in the imaging bands, only the specific State necessary for drawing is required to be read back, not the sequence of every change to the GrafPort.

Such an arrangement nevertheless uses a relatively large amount of data to save States. In particular, storing pen patterns and fill patterns in each State results in a large amount of data being stored and retrieved.

What is needed, then, is a method whereby graphic images may be produced using fewer disk accesses and less disk space (especially as compared with the DrawPicture methodology) without reducing the ability to recreate the exact drawing environment specified by a drawing application.

SUMMARY OF THE INVENTION

The present invention, generally speaking, provides a method of producing graphic images that fulfills the foregoing objects. A graphic image is produced using a set of graphics primitives each graphic primitive of which is executed (as in QuickDraw) in accordance with a current state of a graphics environment at a time when a command invoking the graphics primitive was received. The current state of the graphics environment is specified by a collection of information fields and is modified at times by an image source (for example, a drawing application). A record is maintained of a previous state of the graphics environment, and the current state of the graphics environment is compared to the previous state. If any information fields have changed, a current value of each changed information field is recorded in a uniquely identifiable location. The current state is then recorded using a record specifying the current values of each changed information field by reference to the uniquely identifiable location. Image capture is thereby accomplished. During image playback, a previous state of the graphics environment is read back and a record of the same maintained. Then a subsequent state of the graphics environment is read back. The subsequent state of the graphics environment is compared to the previous state. If any information fields have changed, a value of each changed information field is read back from the uniquely identifiable location in which it is stored. The record of the previous state of the graphics environment is then modified to reflect any changed information fields.

BRIEF DESCRIPTION OF THE DRAWING

The present invention may be further understood from the following description in conjunction with the appended drawing. In the drawing:

FIG. 4 is a diagram of a new state format in accordance with the present invention;

FIG. 5 is a diagram of an old state format; and

DETAILED DESCRIPTION OF THE PREFERRED EMBODIMENTS

The present invention may best be understood by means of a detailed comparison, with reference to a specific example, of the steps required during capture and playback (translation) in accordance with previous methods and in accordance with a preferred embodiment of the present invention.

Figure 1:
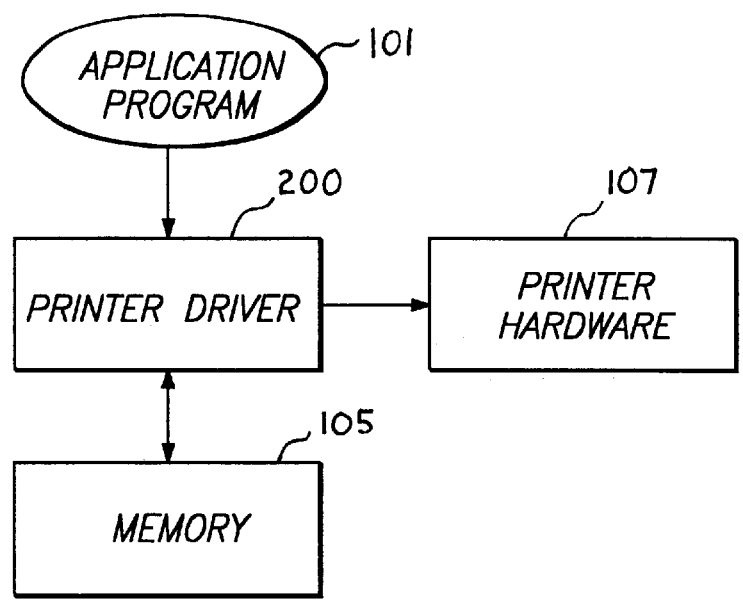
FIG. 1 is a block diagram of showing a printer driver in relation to other elements of a computer graphics system.
Figure 2:
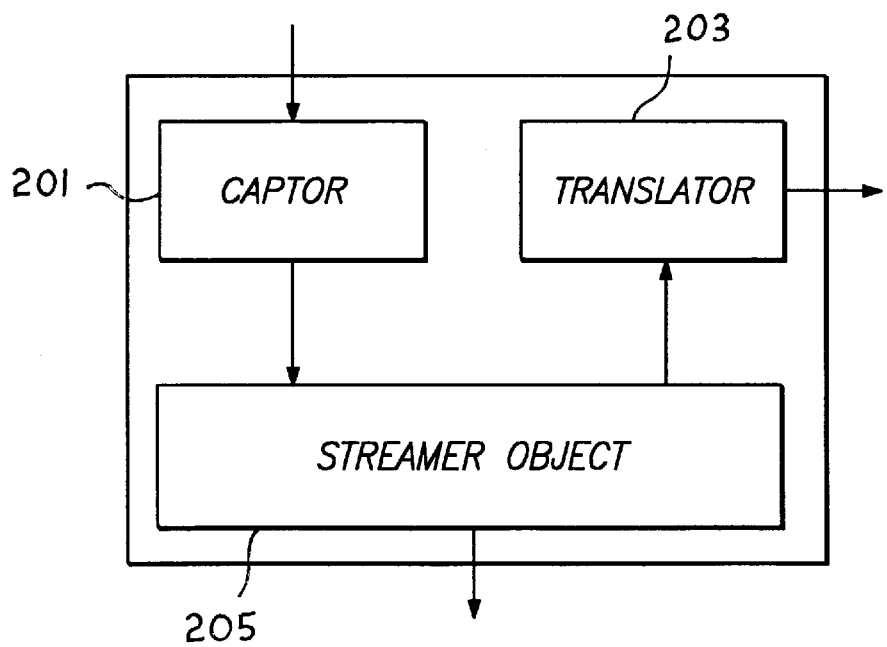
FIG. 2 is a block diagram showing in greater detail the principal modules of the printer driver of FIG. 1.

Referring first to FIG. 2, the printer driver 200 may be regarded as principally comprising a capture module, or "captor" 201, that causes drawing commands and drawing environment (GrafPort) changes issued by the application program to be recorded, a playback module, or "translator" 203, that plays back information caused to be recorded captor and executes graphics primitives to image a band of the picture information and send the band to the printer hardware, and a stream manager, or "streamer object" 205, that serves as a communications interface to memory. The memory may be, for example, cache memory, disk memory, or a combination of both.

Figure 3:
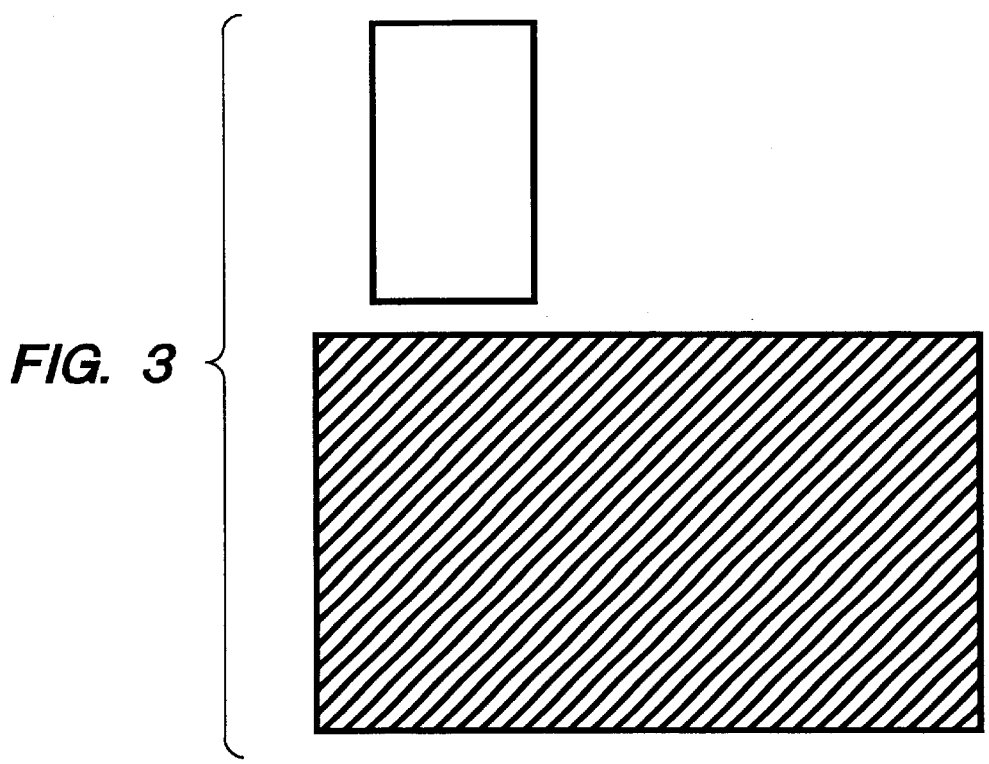
FIG. 3 is an example of an image to be drawn by a printer driver.

To take a highly simplified example, assume that the application program instructs the printer driver to print an image of FIG. 3, containing first and second rectangles having pen patterns and fill patterns as shown.

In accordance with a previous method, the GrafPort is compared with a previously saved copy to determine if anything has changed in the GrafPort. If a change is discovered, every important field of the GrafPort is copied to a State record, and the State is sent to the streamer object to be saved in the stream. During capture, therefore, the following steps occur:

1. The application sets the initial GrafPort settings.
2. The application draws the first rectangle frame.
3. The captor compares the current GrafPort to the previous state saved.
4. A change of pen pattern is discovered.
5. Each part of the GrafPort is copied to memory, color matched (in the case of Color QuickDraw), and saved in the stream as a single state.
6. The first rectangle shape is saved to stream with a reference to the new state just saved.
7. The application changes the fill pattern.
8. The application draws the second rectangle.
9. The captor compares the current GrafPort to the previous saved state.
10. Changes (the change in fill pattern) force each part of the GrafPort to be copied, color matched, and saved in the stream.

During translation, the following steps occur:

11. The translator causes the first rectangle to be read in.
12. The translator compares the state reference saved with the rectangle to the previous state and discovers differences.
13. The new state referenced in the rectangle shape is read in.

14. Each field of the new state is compared to the GrafPort, and any different fields are updated in the GrafPort.
15. The translator executes the appropriate graphics primitive to draw the rectangle frame.
16. The translator causes the second rectangle to be read in.
17. State comparison forces the new state to be read in from the stream.
18. Each field of the new state is compared to the GrafPort, and any different fields are updated in the GrafPort.
19. The translator executes the appropriate graphics primitive to draw the second rectangle.

Because every important field of the GrafPort is saved to State and that State is saved to stream each time a change is discovered, considerable overhead is incurred writing to and reading from memory, most often disk memory.

By contrast, in accordance with the present method, rather than filling up the State with the contents of each pattern and clip region, references to each of these members are stored in the state. This referencing allows each component of a State to be saved separately while still allowing the state to be reproduced precisely when it is time to draw. Furthermore, referencing allows significant time to be saved during state comparison. Where as previous drivers have required a State to GrafPort comparison at translation time, in the present method, each reference in the current state may be compared with references from the previous state to see which fields have changed. Comparing references, which may be stored in four bytes, is much faster than comparing large patterns and regions.

In accordance with the present method, during capture, the following steps occur:

1. The application sets the initial GrafPort settings.
2. The applications draws the first rectangle frame.
3. The captor compares the current GrafPort with components of the previously saved state.
4. A change to the pen pattern is discovered.
5. The new pen pattern is written to the stream.
6. The current state is updated with a reference to the new pen pattern and written out.
7. The rectangle shape is saved to stream with a reference to the new state.
8. The application changes the fill pattern.
9. The application draws the second rectangle.
10. The captor compares the current GrafPort the previous saved state.
11. A new fill pattern is discovered.
12. The newfill pattern is written to the stream.
13. The current state is updated with a reference to the new fill pattern, and written out.
14. The second rectangle shape is saved to stream with a reference to the new state.

Note the important difference in steps 5 and 6 and steps 11 and 12 during capturing. A complete state is no longer written out when the pen pattern of the fill pattern changes. Instead, the new pattern itself is written out and a reference to it is saved in the state. What gets written out as the new state is therefore a collection of references, not the patterns themselves.

In accordance with the present method, during translation, the following steps occur:

15. The translator reads in the first rectangle.
16. The translator compares state reference stored along with the rectangle shape with the previous state and discovers that the pen pattern reference has changed.
17. The new pen pattern is read in and updated in the GrafPort.
18. The translator draws the rectangle frame.
19. The translator reads in the second rectangle.
20. The translator discovers that the state reference has changed and reads in the new state. It then compares the new state references to the previous state references and discovers that the fill pattern reference has changed.
21. The new fill pattern is read in and updated in the GrafPort.
22. The translator draws the second rectangle.

Note the important difference in steps 16 and 17 and steps 20 and 21 during translation. Instead of comparing every field of the new state with the GrafPort, the translator notices a new reference in the state indicating that a field of the GrafPort must be updated and simply updates that field.

FIG. 4 shows the new format of the state information. Note that for each of the following items, each item is saved to stream separately, with references stored in the current state, not the whole item: clipping region, visible region, pen pattern, fill pattern, and back pattern. The information saved to stream as the State for a given drawing operation includes a total of 40 bytes of information. In prior methods in which the foregoing items are saved in the state itself, as shown in FIG. 5, the information saved to stream as the state includes a total of approximately 200 bytes of information. Depending on the number and frequency of GrafPort changes, the present method can reduce memory access overhead by ½ or more. In extreme case in which the clipping regions or visible regions are large (up to 32,000 bytes), the improvement factor is considerably larger.

Figure 6:
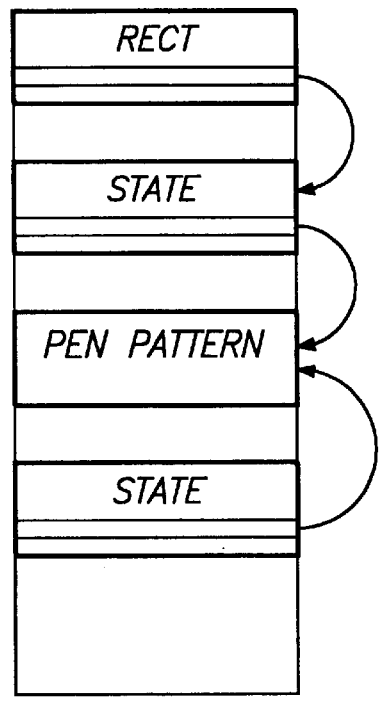
FIG. 6 is a simplified diagram of a file format using the state representation of FIG. 4.

FIG. 6 shows the resulting file stored out and read back by the streamer object. A shape record, such as Rect representing a rectangle, is stored with a pointer to a state record. The state record points in turn to items such as a pen pattern. The same item may also be pointed to by other state records.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. Using a computer having a memory system, a method for use in producing a graphic image using a set of graphics primitives each of which is executed in accordance with a current state of a graphics environment at a time when a command invoking the graphics primitive was received, the current state of the graphics environment including a plurality of state elements and being changed at times by an image source, the method comprising the steps of:

each time a state element has changed from when a previous command involving a graphics primitive was received to when a current command involving a graphics primitive was received:

saving in the memory system an instance of that state element containing current information for that state element; and saving in the memory system a graphics state object including for each of said plurality of state elements a pointer to a most recently saved instance of that state element;

wherein each graphics state object includes a pointer to only one instance of a given state element, and at least some instances of state elements are pointed to by multiple graphics state objects.

2. The method of claim 1, comprising the further steps of:

reading back and maintaining a record of a previous state of the graphics environment;

reading back a subsequent state of the graphics environment;

comparing pointers of each of said plurality of state elements of the subsequent state of the graphics environment to corresponding pointers of the previous state;

for each such comparison, if the pointers do not coincide, thereby indicating that the corresponding state element was changed, modifying the record of the previous state of the graphics environment to reflect the changed state element.

3. The method of claim 2, wherein the plurality of state elements include a Clipping Region, a Visible Region, a Pen Pattern, a Fill Pattern and a Background Pattern.

\* \* \* \* \*